(12) United States Patent
Hellfajer et al.

(10) Patent No.: US 9,084,123 B2
(45) Date of Patent: Jul. 14, 2015

(54) RADIO COMMUNICATION DEVICES AND METHODS FOR CONTROLLING A RADIO COMMUNICATION DEVICE

(71) Applicant: Intel Mobile Communications GmbH, Neubiberg (DE)

(72) Inventors: Roland Hellfajer, Bochum (DE); Peter Ascheuer, Duesseldorf (DE); Michael Warmers, Erkelenz (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 220 days.

(21) Appl. No.: 13/707,668

(22) Filed: Dec. 7, 2012

(65) Prior Publication Data

US 2014/0162567 A1    Jun. 12, 2014

(51) Int. Cl.
*H04B 17/00*  (2006.01)
*H04W 24/00*  (2009.01)
*H04W 48/16*  (2009.01)

(52) U.S. Cl.
CPC .............. *H04W 24/00* (2013.01); *H04W 48/16* (2013.01)

(58) Field of Classification Search
CPC ................................ H04W 24/00; H04W 8/16
USPC ...................... 455/67.13, 67.11, 226.1, 226.2
See application file for complete search history.

(56) References Cited

U.S. PATENT DOCUMENTS 8,654,658 B2 *  2/2014  Mori .............................. 370/252

OTHER PUBLICATIONS

3GPP TS 34.121 V6.4.0 (Mar. 29, 2006) 3rd Generation Partnership Project; Technical Specification Group Radio Access Network; Terminal conformance specification; Radio transmission and reception (FDD); (Release 6) pp. 1-21.

* cited by examiner

*Primary Examiner* — Eugene Yun

(57) ABSTRACT

A radio communication device may be provided. The radio communication device may include: a measurement circuit configured to measure a reception quality of a signal from another radio communication device; a retention time determiner configured to determine a retention time based on the measured reception quality; and a memory configured to store information related to the other radio communication device for a period of time, the period of time based on the determined retention time.

25 Claims, 3 Drawing Sheets

600

602

Store information related to another radio communication device for a period of time, the period of time based on a retention time, the retention time based on a measured reception quality of a signal from the other radio communication device

RADIO COMMUNICATION DEVICES AND METHODS FOR CONTROLLING A RADIO COMMUNICATION DEVICE

TECHNICAL FIELD

Aspects of this disclosure relate generally to radio communication devices and methods for controlling a radio communication device.

BACKGROUND

A radio communication devices may perform measurements, for example of radio base stations, and may store information about the measurements or about the measured radio base stations. The amount of information to be stored may be large. So it may be desired to delete information whenever possible. However, in case of deleting information which is needed at a later stage, subsequent processing may be more cumbersome, as the deleted information may be desired to be acquired anew. Thus, there arises the problem of finding a trade-off between storage required and computing power.

SUMMARY

A radio communication device may include: a measurement circuit configured to measure a reception quality of a signal from another radio communication device; a retention time determiner configured to determine a retention time based on the measured reception quality; and a memory configured to store information related to the other radio communication device for a period of time, the period of time based on the determined retention time.

A method for controlling a radio communication device may include: measuring a reception quality of a signal from another radio communication device; determining a retention time based on the measured reception quality; and storing information related to the other radio communication device for a period of time, the period of time based on the determined retention time.

A radio communication device may include: a memory configured to store information related to another radio communication device for a period of time, the period of time based on a retention time, the retention time based on a measured reception quality of a signal from the other radio communication device.

A method for controlling a radio communication device may include: storing information related to another radio communication device for a period of time, the period of time based on a retention time, the retention time based on a measured reception quality of a signal from the other radio communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which.

DESCRIPTION

Figure 1:
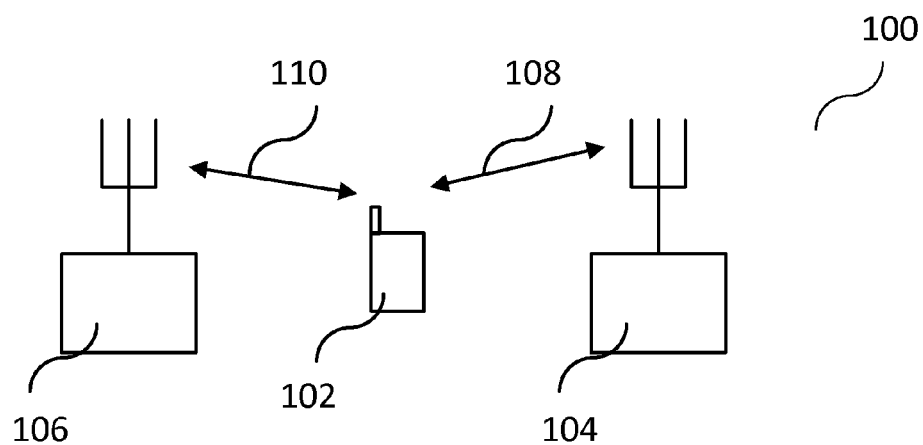
FIG. 1 shows a mobile radio communication system.

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A radio communication device may be an end-user mobile device (MD). A radio communication device may be any kind of mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS), for example in accordance with IEEE 802.16m.

In various embodiments, a radio base station may be a radio base station operated by a network operator (which may also be referred to as a legacy base station), e.g. a NodeB or an eNodeB, or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard, for example for IEEE 802.16m The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a mobile radio communication system 100. A radio communication device 102 may receive a signal from a first base station 104, for example wirelessly like indicated by arrow 108. The radio communication device 102 may further receive a signal from a second base station 106, for example wirelessly like indicated by arrow 110. The radio communication device 102 may perform measurements, for example of the first radio base station 104 and of the second radio base station 106, and may store information about the measurements or about the measured radio base stations.

Improved cell list management using adaptive timeouts may be provided.

A radio communication device, for example a UMTS (Universal Mobile Telecommunications System) User Equipment (UE), may perform CPICH (common pilot channel) measurements (RSCP (received signal code power) and Ec/N0 (wherein Ec (or RSCP)/No (or RSSI (Received Signal Strength Indication)–total receive power) may be the received energy per chip divided by the power density in the band. 'No' may include the power of specified cell and may indicate a total receive power)) of neighbor cells in certain time intervals that may be dependent on the RRC (Radio Resource Control) state the UE is in. The 3GPP (Third Generation Partnership Project) specification may define the timing delay until a change of the signal strength of a neighbor cell must be reported to the NodeB. The reporting may be done by triggering measurements events, such as 1A ("A primary CPICH enters the reporting range"), 1B ("A primary CPICH leaves the reporting range"), 1C ("A non-active primary CPICH becomes better than an active primary CPICH") and others.

A CPICH measurement circuit may be divided into a cell searcher and a delay profile estimator. The cell searcher may identify a single reception peak of a cell by performing a slot synchronization, frame synchronization and a correlation with the cell's scrambling code, whereas the delay profile estimator (DPE) may discover the whole delay profile using the information from the cell searcher and performs the RSCP and Ec/N0 measurements. When a cell has been discovered by the cell searcher, it may be measured periodically.

The cell list manager may store the cells reported from the searcher into a central cell list and may manage the status, measurement results and cell position update of these cells. In addition, it may also decide when a cell can be removed from the cell list again, because the UE has moved out of range of that cell. The criteria that are used for the cell removal may balance the following criteria:

i) Finding a cell with the cell searcher may take longer than measuring the delay profile with the DPE. So, if a cell is removed too early, the UE may have to cope with this timing penalty. The reporting events may be sent to the NodeB too late.

ii) Cells that are kept in the cell list may be measured periodically, which may increase the power consumption of the UE. The storage space of the cell list may be limited and may overflow, if too many cells are kept. This may for example happen in a high mobility scenario, for example when the UE sees many cells in a short period of time. So the cell list retention time for a single cell may be chosen as short as possible for this scenario.

iii) The measurement capacity of the DPE may be limited, for example it may only measure certain number of cells within a certain time period. Therefore, in situations in which many cells are stored inside the cell list, this may lead to the fact that the possible candidate cells for the measurement event generation may be measured less often and consequently changes in the cell power may be detected later, which may result in a too late measurement event generation.

According to the 3GPP conformance specification for UEs (34.121), the criterion for removing a cell from the cell list may be derived. Testcase 8.6.1.1a may require that "if a cell, belonging to monitored set, which the UE has identified and measured at least once over the measurement period, becomes undetectable for a period<5 seconds and then the cell becomes detectable again and triggers an event, the measurement reporting delay shall be less than TMeasurement_Period_Infra ms provided the timing to that cell has not changed more than +/−32 chips, the UE CPICH measurement capabilities defined above are valid and L3 filtering has not been used. When L3 filtering is used an additional delay can be expected".

If the cell was removed from the cell list during the 5 s, detecting the cell again with the cell searcher and performing a measurement with the DPE may take longer than the required TMeasurement_Period_Intra. Therefore every cell may be kept in the cell list for at least 5 s, even if the measurements results indicate that the cell is not visible anymore.

This criterion may not take into account the total strength of the cell, for example it may be applied for every cell that has been found by the searcher. Consequently this criterion may lead to the fact that weak cells which will never be considered for the measurement event generation may remain inside the cell list and may consume measurement bandwidth and may lead to unnecessary power consumption.

Devices and methods may be provided for optimized cell list handling with respect to performance needs and power consumption. The retention time of cells in the cell list may not be fixed, but be dependent on the measurement results (for example RSCP or Ec/N0) from that neighbor cell. A maximum RSCP value (RSCP_max) or a maximum Ec/N0 value (Ec/N0 max) may be defined where the retention time reaches its maximum, for example 5s, in order to fulfill the conformance test requirements. Smaller RSCP or Ec/N0 values may reduce the retention time of the neighbor cell. This may reflect the situation when the UE passes by a cell at the cell edge. The cell may be weak and may disappear after a short period of time. If the UE is closer to the cell and measures a higher RSCP or Ec/N0, it may take longer for the UE to move beyond the cell edge and the cell may be measured for a longer period of time.

The retention time of a neighbor cell in the User Equipment's memory may be dependent on the CPICH measurements results (RSCP or Ec/N0). Thus, performance needs, power and memory consumption may be enhanced.

Figure 2:
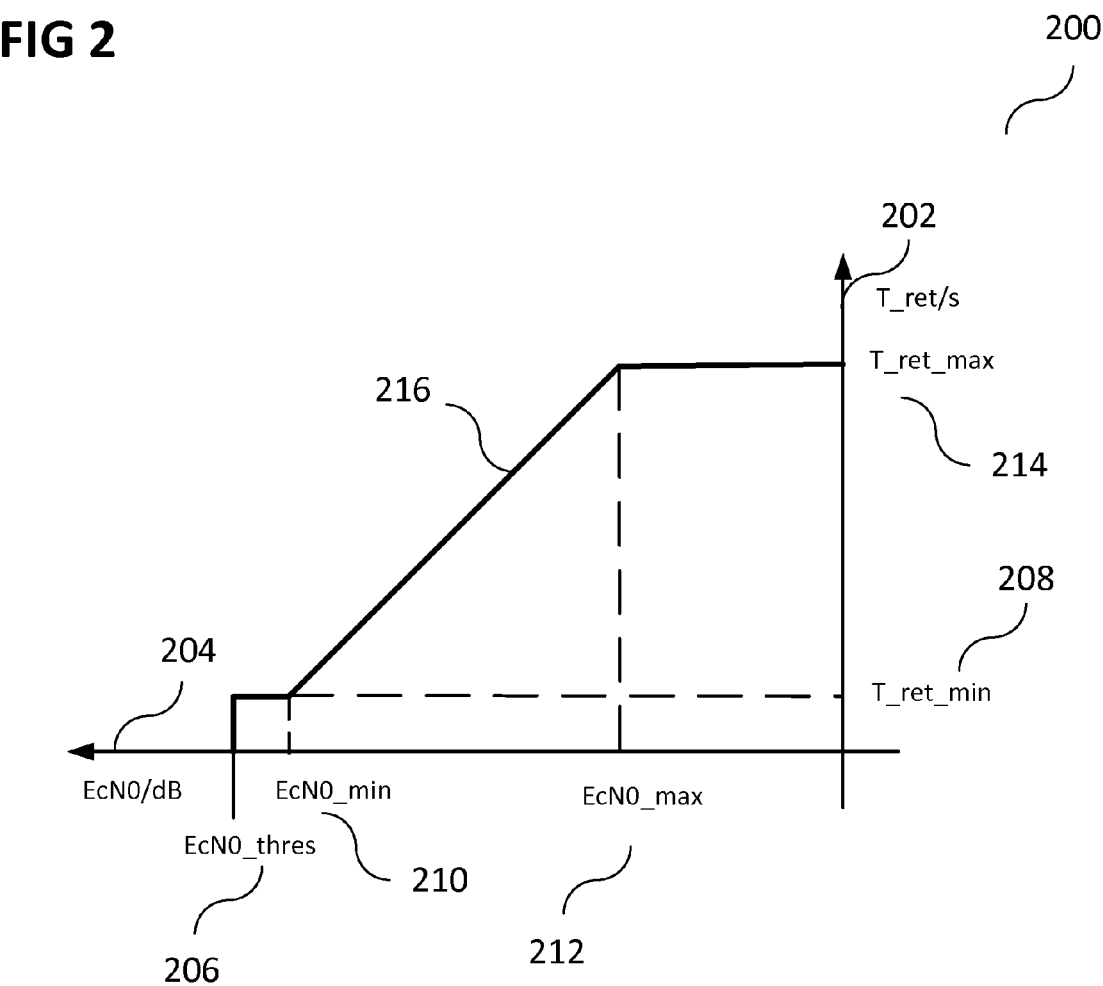
FIG. 2 shows a dependency of a retention time from a measured reception quality.

FIG. 2 shows a diagram 200 illustrating a dependency of retention time from a measured Ec/N0 value. On a horizontal axis 204, Ec/No in dB is shown. On a vertical axis 202, a retention time T_ret in s (seconds) is shown. A bold line 216 illustrates the retention time as a function of the measured Ec/N0 value. If the measured Ec/N0 value is below a threshold 206 (EcN0_thres, which may also be referred to as a second lower reception quality threshold), the retention time may be zero (in other words: the information with respect to the radio base station may not be stored). Above the threshold 206, but below a minimum value 210 (EcN0_min, which may also be referred to as a first lower reception quality threshold) for the Ec/N0, the retention time may be set to a minimum retention time 208 (T_ret_min). Between the minimum value 210 and a maximum value 212 (EcN0_max, which may also be referred to as an upper reception quality threshold) for the Ec/N0, the retention time may increase, for example linearly, for example to a maximum retention time 214 (T_ret_max). Above the maximum value 212 for the Ec/N0, the retention time may be set to the maximum retention time 214.

For example, the Ec/N0 may be used as criterion to choose the retention time for neighbor cells in the UE's cell list. The maximum retention time (T_ret_max 214) and the value EcN0_max 212, where the maximum retention time is reached, may be set, so that the requirements in 34.121 are fulfilled (for example like shown in FIG. 2). At EcN0_min 210, the retention time may reach its minimum possible value T_ret_min 208 (for example a few hundred ms). The two points (EcN0_min/T_ret_min and EcN0_max/T_ret_max) may be connected by any function. For example, a linear relation between EcN0 and T_ret as shown in FIG. 2 may be provided. Weak cells with Ec/N0<EcN0_thres may not be kept in the cell list, in other words: the retention time may be 0.

It will be understood that the relation between the measured reception quality and the determined retention time may be any kind of function, for example any kind of monotonic function, for example a function which is strictly monotonic in a pre-determined interval. The function illustrated in FIG. 2 is just one example of various kinds of possible functions.

When the DPE delivers a new Ec/N0 measurement result, the cell list manager may compare the retention time that corresponds to the measured Ec/N0 to the remaining retention time stored in the cell list. If the new retention time is larger, the stored value in the cell list may be updated. Otherwise the value may be kept.

Devices and methods may be provided with an optimized measurement circuit for optimum performance while minimizing area and power consumption.

In an alternative to the power optimized split between Searcher and DPE, the detection time of the cell searcher may be reduced by multiplying the used correlators, so that many cell positions may be tracked simultaneously. Chip area size may be much higher though.

Figure 3:
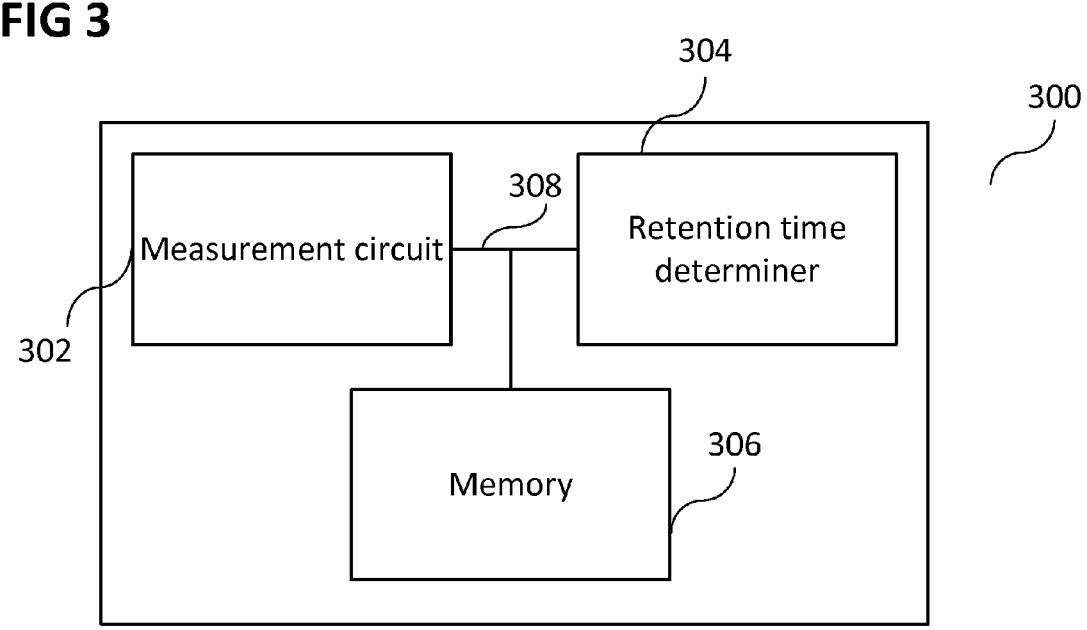
FIG. 3 shows a radio communication device with a measurement circuit, a retention time determiner, and a memory.

FIG. 3 shows a radio communication device 300. The radio communication device 300 may include a measurement circuit 302 configured to measure a reception quality of a signal from another radio communication device (not shown). The radio communication device 300 may further include a retention time determiner 304 configured to determine a retention time based on the measured reception quality. The radio communication device 300 may further include a memory 306 configured to store information related to the other radio communication device for a period of time. The period of time may be based on the determined retention time. The measurement circuit 302, the retention time determiner 304, and the memory 306 may be coupled with each other, for example via a connection 308, for example an optical connection or an electrical connection, such as for example a cable or a computer bus or via any other suitable electrical connection to exchange electrical signals.

The reception quality may include or may be at least one of a RSCP and a Ec/N0.

The retention time determiner 304 may determine longer (or equal) reception times for higher reception qualities.

The retention time determiner 304 may determine the retention time based on a monotonically increasing function mapping reception qualities to retention times.

The monotonically increasing function may be strictly increasing in a range between a first lower reception quality threshold and an upper reception quality threshold.

The monotonically increasing function may be constant below the first lower reception quality threshold.

The monotonically increasing function may be constant above the upper reception quality threshold.

A maximum retention time may be about 5 seconds.

The memory 306 may discard information related to the other radio communication device if the reception quality is below a second lower reception quality threshold.

The other radio communication device may be or may include a radio base station.

The memory 306 may store information related to the other radio communication device in a cell list.

Figure 4:
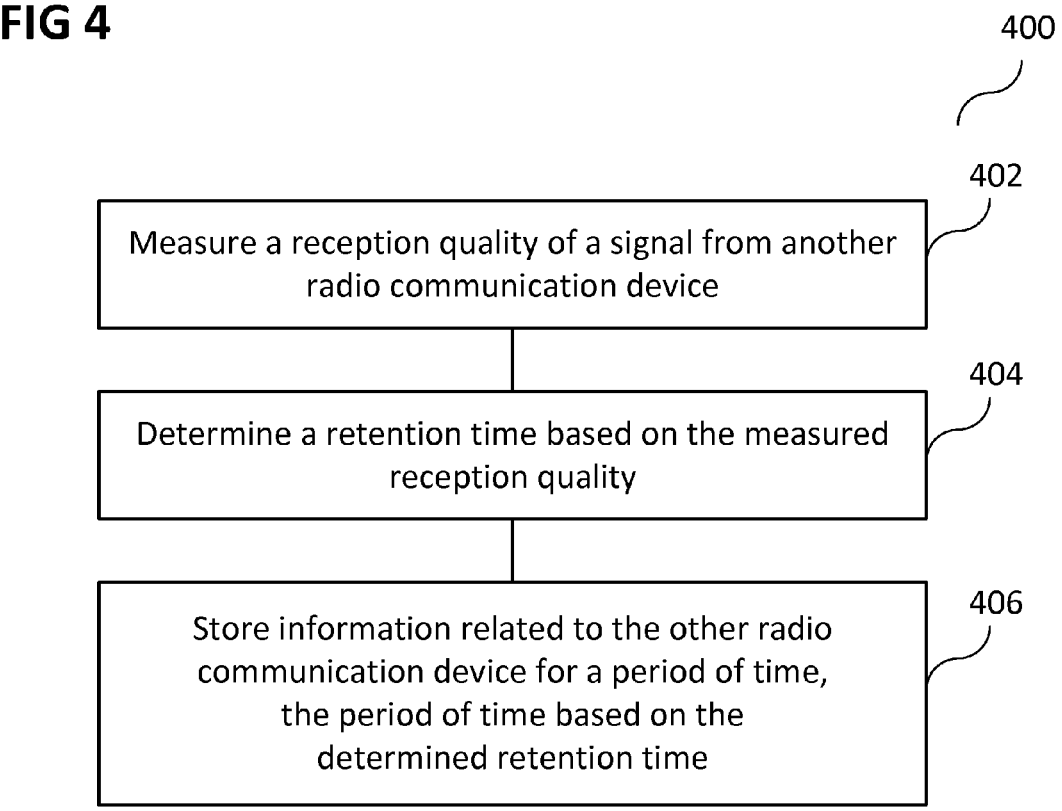
FIG. 4 shows a flow diagram illustrating a method for controlling a radio communication device with a measurement circuit, a retention time determiner, and a memory.

FIG. 4 shows a flow diagram 400 illustrating a method for controlling a radio communication device. In 402, a measurement circuit of the radio communication device may measure a reception quality of a signal from another radio communication device. In 404, a retention time determiner of the radio communication device may determine a retention time based on the measured reception quality. In 406, a memory of the radio communication device may store information related to the other radio communication device for a period of time. The period of time may be based on the determined retention time.

The reception quality may include or may be at least one of a RSCP and a Ec/N0.

The retention time determiner may determine longer (or equal) reception times for higher reception qualities.

The retention time determiner may determine the retention time based on a monotonically increasing function mapping reception qualities to retention times.

The monotonically increasing function may be strictly increasing in a range between a first lower reception quality threshold and an upper reception quality threshold.

The monotonically increasing function may be constant below the first lower reception quality threshold.

The monotonically increasing function may be constant above the upper reception quality threshold.

A maximum retention time may be about 5 seconds.

The memory may discard information related to the other radio communication device if the reception quality is below a second lower reception quality threshold.

The other radio communication device may be or may include a radio base station.

The memory may store information related to the other radio communication device in a cell list.

Figure 5:
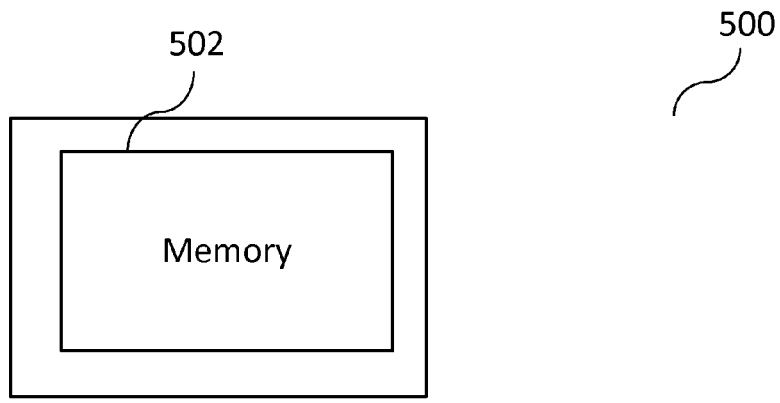
FIG. 5 shows a radio communication device with a memory.

FIG. 5 shows a radio communication device 500. The radio communication device 500 may include a memory 502 configured to store information related to another radio communication device for a period of time. The period of time may be based on a retention time. The retention time may be based on a measured reception quality of a signal from the other radio communication device.

The memory 502 may store information related to the other radio communication device in a cell list.

Figure 6:
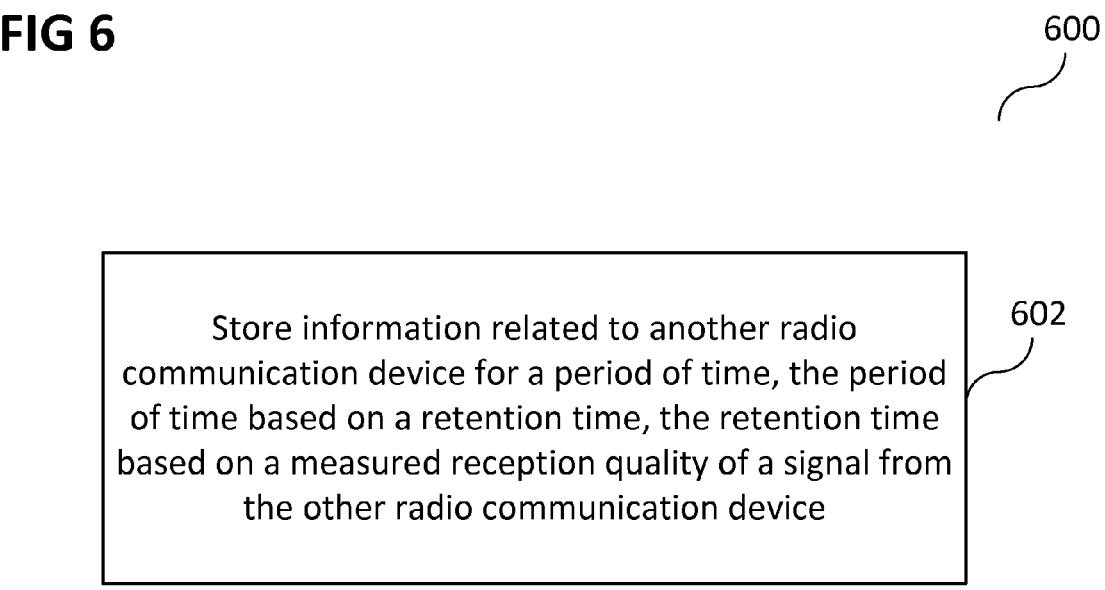
FIG. 6 shows a flow diagram illustrating a method for controlling a radio communication device with a memory.

FIG. 6 shows a flow diagram 600 illustrating a method for controlling a radio communication device. In 602, a memory of the radio communication device may store information related to another radio communication device for a period of time. The period of time may be based on a retention time. The retention time may be based on a measured reception quality of a signal from the other radio communication device.

The memory may store information related to the other radio communication device in a cell list.

Any one of the radio communication devices described above may be a radio communication device configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising:
   a measurement circuit configured to measure a reception quality of a signal from another radio communication device;
   a retention time determiner configured to determine a retention time that varies based on a value of the measured reception quality; and
   a memory configured to store information related to the other radio communication device for a period of time, the period of time based on the determined retention time.

2. The radio communication device of claim 1, wherein the reception quality comprises at least one of a received signal code power and a received energy per chip divided by a power density in a band.

3. The radio communication device of claim 1, the retention time determiner configured to determine longer or equal retention times for higher reception qualities.

4. The radio communication device of claim 1, the retention time determiner configured to determine the retention time based on a monotonically increasing function mapping reception qualities to retention times.

5. The radio communication device of claim 4, wherein the monotonically increasing function is strictly increasing in a range between a first lower reception quality threshold and an upper reception quality threshold.

6. The radio communication device of claim 5, wherein the monotonically increasing function is constant below the first lower reception quality threshold.

7. The radio communication device of claim 5, wherein the monotonically increasing function is constant above the upper reception quality threshold.

8. The radio communication device of claim 1, wherein a maximum retention time is about 5 seconds.

9. The radio communication device of claim 1, the memory configured to discard information related to the other radio communication device if the reception quality is below a second lower reception quality threshold.

10. The radio communication device of claim 1, wherein the other radio communication device is a radio base station.

11. The radio communication device of claim 1, the memory configured to store information related to the other radio communication device in a cell list.

12. A method for controlling a radio communication device, the method comprising:
measuring a reception quality of a signal from another radio communication device;
determining a retention time that varies based on a value of the measured reception quality; and
storing information related to the other radio communication device for a period of time, the period of time based on the determined retention time.

13. The method of claim 12, wherein the reception quality comprises at least one of a received signal code power and a received energy per chip divided by a power density in a band.

14. The method of claim 12, further comprising:
determining longer or equal retention times for higher reception qualities.

15. The method of claim 12, further comprising:
determining the retention time based on a monotonically increasing function mapping reception qualities to retention times.

16. The method of claim 15, wherein the monotonically increasing function is strictly increasing in a range between a first lower reception quality threshold and an upper reception quality threshold.

17. The method of claim 16, wherein the monotonically increasing function is constant below the first lower reception quality threshold.

18. The method of claim 16, wherein the monotonically increasing function is constant above the upper reception quality threshold.

19. The method of claim 12, further comprising:
discarding information related to the other radio communication device if the reception quality is below a second lower reception quality threshold.

20. The method of claim 12, wherein the other radio communication device is a radio base station.

21. The method of claim 12, further comprising:
storing information related to the other radio communication device in a cell list.

22. A radio communication device comprising:
a memory configured to store information related to another radio communication device for a period of time, the period of time based on a retention time,
wherein the retention time varies based on a value of a measured reception quality of a signal from the other radio communication device.

23. The radio communication device of claim 22, the memory configured to store information related to the other radio communication device in a cell list.

24. A method for controlling a radio communication device, the method comprising:
storing information related to another radio communication device for a period of time, the period of time based on a retention time, wherein the retention time varies based on a value of a measured reception quality of a signal from the other radio communication device.

25. The method of claim 24, further comprising:
storing information related to the other radio communication device in a cell list.

* * * * *